(12) United States Patent
Karaoguz et al.

(10) Patent No.: US 8,064,343 B2
(45) Date of Patent: Nov. 22, 2011

(54) UTILIZING A REPLACEMENT PATHWAY FOR LOST PACKET DELIVERY DURING MEDIA RECEPTION IN A SET-TOP BOX (STB)

(75) Inventors: Jeyhan Karaoguz, Irvine, CA (US); James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 167 days.

(21) Appl. No.: 12/323,240

(22) Filed: Nov. 25, 2008

(65) Prior Publication Data
US 2010/0128595 A1 May 27, 2010

(51) Int. Cl.
*H04L 1/00* (2006.01)
(52) U.S. Cl. ........................................ 370/230; 370/235
(58) Field of Classification Search .................. 370/229, 370/230, 231, 235, 389, 390, 394, 395.5–395.52, 370/400–401, 473, 474
See application file for complete search history.

(56) References Cited

U.S. PATENT DOCUMENTS
6,031,818 A * 2/2000 Lo et al. ..................... 370/216
* cited by examiner

*Primary Examiner* — Frank Duong
(74) *Attorney, Agent, or Firm* — McAndrews, Held & Malloy, Ltd.

(57) ABSTRACT

A replacement pathway in an STB is utilized to determine loss of packets and delivery error during reception of media broadcasts, and to retrieve replacement data from one or more replacement media servers. The retrieval of the replacement data is performed during playback of the received media broadcasts. The communication of media broadcast incorporates delays to accommodate the retrieval of replacement data. Alternatively, received broadcast media streams are buffered to enable retrieval of replacement data and to provide seamless presentation of media content in the media broadcasts. The replacement media server performs access authentication operations during replacement data retrieval. The replacement media server is accessed via markup language, for example, HTML and/or XML, based interfaces and/or dedicated APIs. The replacement media server may deny replacement data based on plurality of service criteria such as acceptance and denial criteria, which may comprise allowable bandwidth and/or error rates.

34 Claims, 5 Drawing Sheets

UTILIZING A REPLACEMENT PATHWAY FOR LOST PACKET DELIVERY DURING MEDIA RECEPTION IN A SET-TOP BOX (STB)

CROSS-REFERENCE TO RELATED APPLICATIONS/INCORPORATION BY REFERENCE

[Not Applicable].

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to communication systems. More specifically, certain embodiments of the invention relate to a method and system for utilizing a replacement pathway for lost packet delivery during media reception in a set-top box (STB).

BACKGROUND OF THE INVENTION

Audiovisual display devices are utilized to play broadcast media streams received from broadcast head-ends. Broadcast media streams are received via the internet and/or via TV broadcasts. For example, Television (TV) broadcasts are generally transmitted by television head-ends over broadcast channels, via RF carriers. The TV head-ends may comprise terrestrial TV head-ends, Cable-Television (CATV), and/or satellite TV head-ends. The TV head-ends may utilize, for example, a set of broadcast channels to facilitate TV broadcast. The TV broadcasts comprise transmission of video and/or audio information, wherein the video and/or audio information may be encoded into the broadcast channels via one of plurality of available modulation schemes. The TV Broadcasts may utilize analog and/or digital modulation format. In analog television systems, picture and sound information are encoded into, and transmitted via analog signals, wherein the audio/video information may be conveyed via broadcast signals, via amplitude and/or frequency modulation on the television signal, based on analog television encoding standard. Analog television broadcasters may, for example, encode their signals using NTSC, PAL and/or SECAM analog encoding and then modulate these signals onto a VHF or UHF RF carriers, for example.

In digital television (DTV) systems, television broadcasts may be communicated by terrestrial, cable, and/or satellite head-ends via discrete (digital) signals, utilizing one or more of available digital modulation schemes, which may comprise, for example, QAM, VSB, QPSK, and/or OFDM. The use of digital signals generally requires less bandwidth than analog signals to convey the same amount of information. Accordingly, DTV systems may enable broadcasters to provide more digital channels within the same space otherwise available to analog television systems. In addition, the use of digital television signals may enable broadcasters to provide high-definition television (HDTV) broadcasting and/or to provide other non-television related service via the digital system. Available digital television systems comprise, for example, ATSC, DVB, and/or VSB based systems. Video and/or audio information may be encoded into digital television signals utilizing various video and/or audio encoding and/or compression algorithms, which may comprise, for example, MPEG-2, MPEG-4 AVC, MP3, AC-3, AAC, and/or HE-AAC.

Media streams are sometimes broadcast via the Internet. Internet head-ends are utilized, for example, to communicate multimedia streaming data, which may correspond to TV broadcasts, via the Internet based on one or more applicable networking standards, including TCP/IP.

Televisions (TVs) and/or other audiovisual playback devices are utilized to play received TV and/or media broadcasts. The received TV and/or media broadcasts are inputted directly into the playback devices, and the playback devices are enabled to perform, for example, necessary tuning and/or processing operations to extract the audio/video information. Alternately, specialized devices referred to as set-top boxes are utilized to provide necessary processing operations that convert TV and/or Internet based media broadcasts to signals suitable for play via the playback devices.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for utilizing a replacement pathway for lost packet delivery during media reception in a set-top box (STB), substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for utilizing a replacement pathway for lost packet delivery during media reception in a set-top box (STB). In various embodiments of the invention, a set-top box (STB) is enabled to determine delivery errors during reception of broadcast media streams from one or more broadcast media sources. The STB is operable to retrieve replacement data from a replacement media server whenever delivery errors occur. The broadcast media sources comprise Internet-based broadcast media sources, satellite head-ends, and/or cable-fiber head-ends. The retrieval of the replacement data is performed during playback of received media streams. Communication of the broadcast media streams comprises the introduction of delays to accommodate for the retrieval of the replacement data from the replacement media server. Received broadcast media streams are buffered within the STB to enable retrieval of replacement data to enable seamless playback of received media streams. During replacement data retrieval operations, the replacement media server performs access authentication operations. The replacement media server also enables creation and/or modification of user related portfolios to facilitate subsequent product verifications and/or user communication. The replacement media server enables interactions by remote users, to request replacement data. Various markup language interfaces and/or dedicated APIs are utilized for user interaction. The replacement media server is operable to accept or deny replacement data requests based on plurality of service criteria such as denial or acceptance criteria, which may comprise allowable bandwidth and/or maximum allowable error rates.

Figure 1:
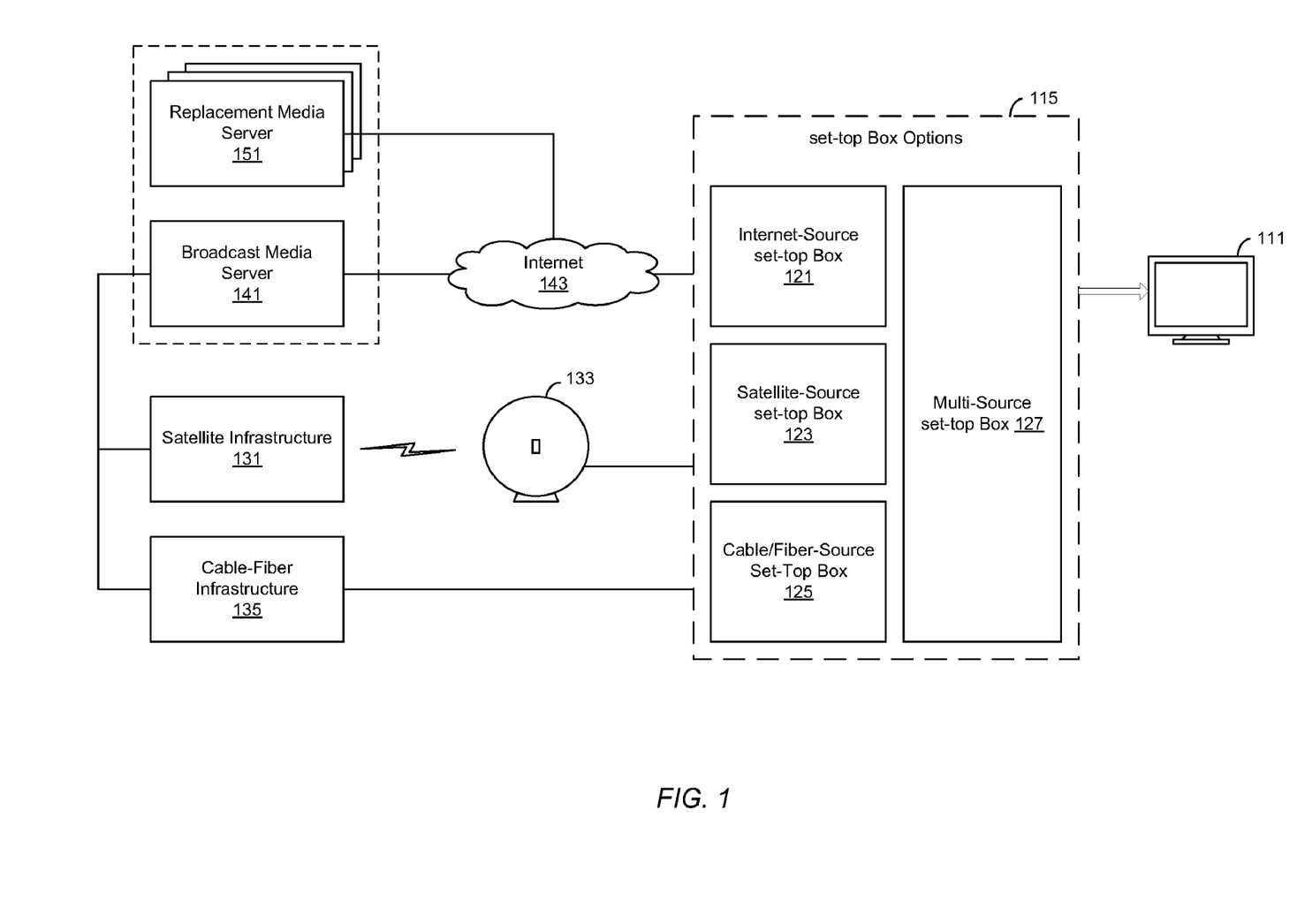
FIG. 1 is a block diagram that illustrates an exemplary set-top box (STB) setup with replacement media servers that provide replacement media data for lost packet delivery during broadcast media reception, in accordance with an embodiment of the invention.

FIG. 1 is a block diagram that illustrates an exemplary set-top box (STB) setup with replacement media servers that provide replacement media data for lost packet delivery during broadcast media reception, in accordance with an embodiment of the invention. Referring to FIG. 1, there is shown a playback device 111, a plurality of set-top box options 115, an Internet-source STB 121, a satellite-source STB 123, a cable-fiber-source STB 125, a multi-source STB 127, a satellite infrastructure 131, a satellite dish 133, a cable-fiber infrastructure 135, a broadcast media server 141, Internet 143, and one or more instances of replacement media server 151.

The playback device 111 comprises suitable logic, circuitry, and/or code that enable playing of media streams. The playback device 111 comprise, for example, a television, monitor or other display device that is operable to enable displaying of video streams and/or any accompanying audio, which is received, directly or via intermediate devices including STBs, from broadcasts head-ends and/or audio/video players.

The plurality of set-top box options 115 comprises one or more STBs to enable reception of media broadcasts from one or more different broadcast media head-ends. The plurality of STB options 115 comprises, for example, the Internet source STB 121, the satellite-source STB 123, the cable-fiber-source STB 125, and/or the multi-source STB 127. The Internet-source STB 121 comprises suitable logic, circuitry, and/or code that enable performing of various processing operations to facilitate reception of broadcast media carried via Internet based signals, which are received from the broadcast media server 141 and/or one or more instances of the replacement media server 151 via the internet 143 for example. The Internet-source STB 121 is operable to extract audio/video information that is then made displayable via audiovisual devices, for example the playback device 111.

The satellite-source STB 123 comprises suitable logic, circuitry, and/or code that enable performing various processing operations to facilitate reception of satellite based media signals, which are received from the satellite infrastructure 131 via the satellite dish 133. The satellite-source STB 123 is operable to extract audio/video information that is then made displayable via audiovisual devices, for example the playback device 111. The cable-fiber-source STB 125 comprises suitable logic, circuitry, and/or code that enable performing various processing operations to facilitate reception of cable/fiber based media signals, which are received via the cable-fiber infrastructure 135. The cable-fiber-source STB 125 is operable to extract audio/video information that is then made displayable via audiovisual devices, for example the playback device 111. The multi-source STB 127 comprises suitable logic, circuitry, and/or code that enable performing various processing operations to facilitate reception of media broadcast from a plurality of supported networks, which comprise satellite, cable-fiber and/or internet based interfaces. The multi-source STB 127 is operable to extract audio/video information from signals received via any supported interfaces, wherein the extracted audio/video information is then made displayable via audiovisual devices, for example the playback device 111.

The satellite infrastructure 131 comprises suitable logic, circuitry, and/or software that enable media broadcasts via, for example, one or more satellite networks. For example, the satellite infrastructure 131 comprises satellite TV head-ends, utilized to enable transmission of satellite TV signals. The satellite infrastructure 131 also comprises necessary terrestrial support, control, and/or relay systems and devices that are operable to enable communication of satellite TV broadcasts via the satellite infrastructure 131. The satellite dish 133 comprises suitable logic, circuitry, and/or software that enabled receiving satellite signaling, which can comprise, for example, satellite media broadcasts. For example, the satellite dish 133 may comprise a dedicated parabolic antenna operable to receive satellite television signals communicated from satellite television head-ends, and to reflect and/or concentrate the received satellite signal into focal point wherein one or more low-noise-amplifiers (LNAs) are to down-convert the received signals to corresponding intermediate frequencies that may be proceed via satellite capable STBs, including, for example, the satellite-source STB 123.

The cable-fiber infrastructure 135 comprises suitable logic, circuitry, and/or software that enable media broadcasts via, for example, one or more cable-fiber backbone networks. For example, the cable-fiber infrastructure 135 may comprise CATV head-ends, utilized to enable communication of cable-television (CATV) broadcasts, and distribution systems that enable forwarding of CATV communication from the CATV head-ends to a plurality of subscribers. The distribution systems comprise, for example, fiber optics and/or coaxial cable networks that enable connectivity between the CATV head-ends and receiving nodes.

The broadcast media server 141 comprises suitable logic, circuitry, and/or software that enable media broadcasts via one or more interconnecting networks, including, for example, the internet 143. The Internet 143 comprises a system of interconnected networks, which enables exchange of information and/or data among a plurality of nodes, based on one or more networking standards, including, for example, TCP/IP. For example, the internet 143 enables connectivity among a plurality of private and public, academic, business, and/or government nodes and networks, wherein the physical connectivity may be provided via the Public Switched Telephone Network (PSTN), via copper wires, fiber-optic cables, wireless interface, and/or other standards-based interfaces. In an exemplary aspect of the invention, the Internet 143 provides connectivity between the plurality of STB options 115, and the broadcast media server 141 and/or the replacement media server 151 to facilitate reception of broadcast media and/or retrieval of replacement media.

The replacement media server 151 comprises suitable logic, circuitry, and/or code that enable storage and/or retrieval of replacement data. For example, the replacement media server 151 is operable to enable retrieving replacement data, via the internet 143, to compensate for lost data in media streams, received via the plurality of STB options 115.

In operation, the set-top box options 115 is utilized to enable playing media broadcasts received from available media broadcast sources via, for example, the playback device 111. For example, the satellite dish 133 is utilized to enable reception of satellite TV signals communicated via, for the satellite infrastructure 131. Satellite TV broadcast comprises plurality of satellite TV channels, wherein signals carrying audio/video information corresponding to the various satellite TV channels are, for example, digitally modulated onto RF carriers. The satellite dish 133 is operable to enable receiving and down-converting, via low-noise-amplifiers (LNAs), downlink satellite RF signals. The resulting signals are then communicated to the satellite-source STB 123. The cable-fiber infrastructure 135 is utilized, for example, to enable communication of Cable TV (CATV) signals broadcast, for example, by CATV head-ends.

The CATV broadcast comprises plurality of CATV channels, wherein signals carrying audio/video information corresponding to the various CATV channels are, for example, digitally modulated onto RF carriers. The cable-fiber infrastructure 135 is operable, for example, to enable receiving CATV RF signals via available CATV distribution systems, and the received CATV signals are then communicated to cable-fiber-source STB 125. The satellite-source STB 123 and/or cable-fiber-source STB 125 are utilized to perform necessary processing operations on received satellite and/or CATV signals. The processing operations comprise, for example, RF tuning and/or reception related operations, which include demodulation, filtering, and/or conversion of the received RF signals to enable extracting communicated data. The processing operations also comprise, for example, necessary operations to decrypt and/or to decode utilized transport packets, and/or to perform necessary video and/or audio decoding and processing. The Internet-source STB 121 is utilized to enable reception of media broadcast communicated by Internet-based head-ends. For example, the Internet-source STB 121 is utilized to enable reception of media broadcast communicated by the broadcast media server 141 via the Internet 143. Internet-based media broadcasts comprise, for example, Internet-based communication comprised of packets carrying audio/video information, based on one or more applicable networking standards, including TCP/IP. The Internet-source STB 121 is operable to enable establishing necessary connectivity to facilitate the reception of media broadcasts. The Internet-source STB 121, the satellite-source STB 123 and/or the cable-fiber-source STB 125 are operable to processes the extracted audio/video information to enable playing or presentation of corresponding media streams via the playback device 111.

In an exemplary embodiment of the invention, the Internet-source STB 121, the satellite-source STB 123 and/or the cable-fiber-source STB 125 are operable to perform frame sequence assembly from received signals and/or packets, to decode the audio/video information received via the broadcast media. The Internet-source STB 121, the satellite-source STB 123 and/or the cable-fiber-source STB 125 are also operable to perform audio/video encoding and/or RF modulation that enables playback of the broadcast media streams via suitable audiovisual devices, for example the playback device 111. The multi-source STB 127 is utilized to enable reception of media streams from one or more available sources. The multi-source 127 enables, for example, combining the operations of the Internet-source STB 121, the satellite-source STB 123 and/or the cable-fiber-source STB 125, wherein common processing functionality and/or operations are performed via shared subsystems, and unique functionality, interface related operations for example, are performed via dedicated sub-devices.

In an exemplary aspect of the invention, one or more of the set-top box options 115 are operable to detect for delivery errors in received media broadcasts. For example, signal and/or packet loss and/or distortion during communication from broadcast head-ends may prevent and/or degrades playback of the received media streams. Delivery errors may also cause and/or result from out-of-sequence frame delivery, where broadcast streams comprise frames that are subject to specific sequence numbering. Out-of-sequence delivery is relevant, for example, with dependent frames whose processing requires audio/video information carried in reference frames that must be received prior to reception of the reference frames. The set-top box options 115 are then operable to retrieve, from one or more instances of the replacement media server 151, replacement data that enable seamless playback of the received media streams. Replacement data may also be retrieved from local storage devices, comprising, for example, internal and/or external memory devices. The local storage devices are utilized, for example, to buffer received broadcasts to enable use of frames that are received out of sequence, for example, as replacement data. In instances where interference, for example, disrupts the communication and/or reception of satellite TV broadcast via the satellite infrastructure 131 and/or the satellite dish 133, the cable-fiber STB 125 detects, for example, the presence of delivery errors. The satellite-source STB 123 determines lost frames, and communicates with the replacement media server 151, via the Internet 143, to request replacement data corresponding to the missing frames. The cable-fiber STB 125 and/or the Internet-source STB 121 operate substantially similar to the satellite STB 123 to perform similar operations to enable detection of delivery errors during reception of media broadcasts from the cable-fiber infrastructure 135 and the broadcast media server 141, respectively. The replacement data, received via the Internet 143, is then combined with the received frames to enable seamless playback of received media streams via the playback device 111.

Figure 2A:
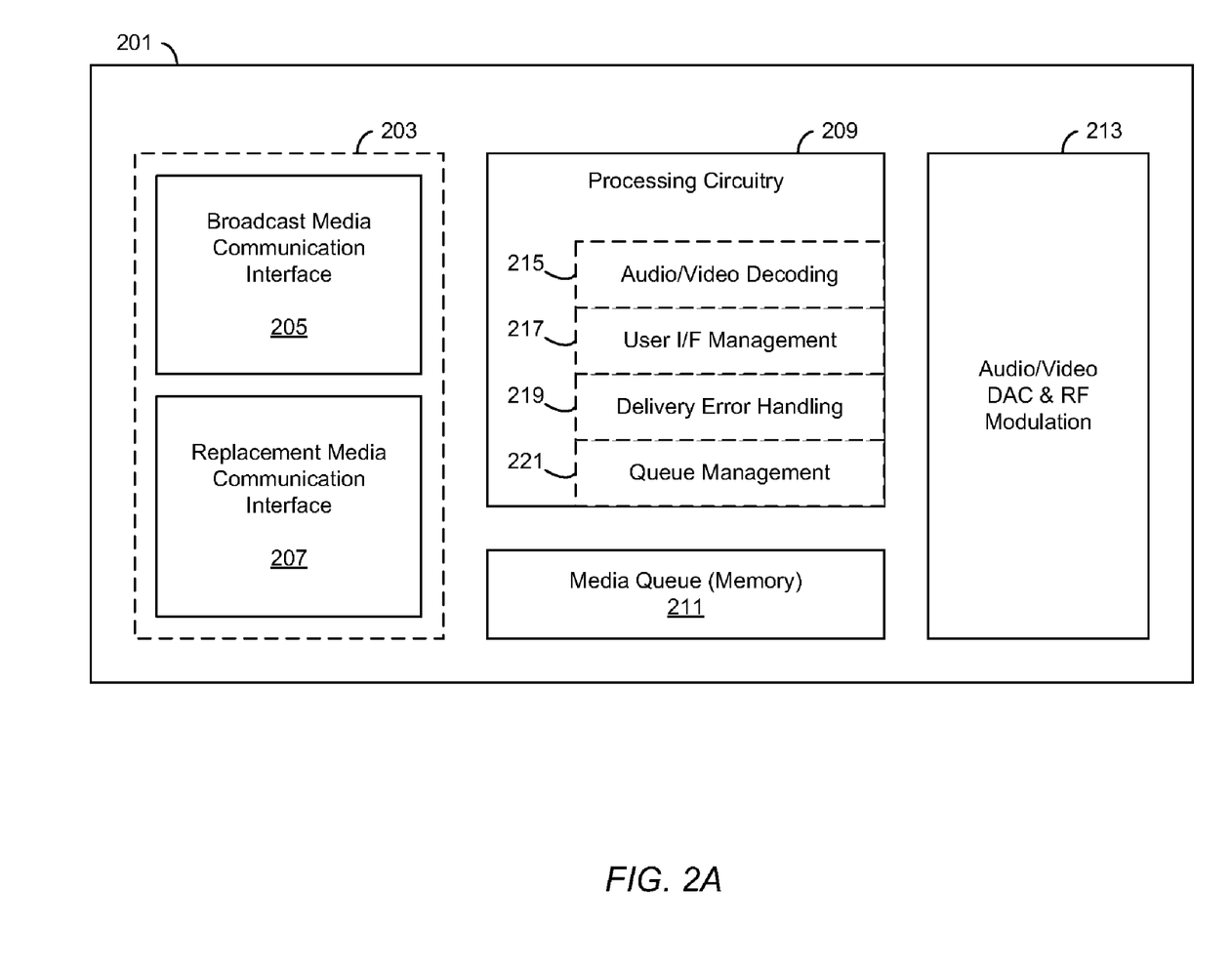
FIG. 2A is a block diagram that illustrates an exemplary system that enables retrieving replacement media data, via a set-top box (STB), from replacement media servers for lost packet deliver during broadcast media reception, in accordance with an embodiment of the invention.

FIG. 2A is a block diagram that illustrates a system that enables retrieval of replacement media data, via a set-top box (STB), from replacement media servers for lost packet deliver during broadcast media reception, in accordance with an embodiment of the invention. Referring to FIG. 2A, there is shown, a media processing system 201, a media communication interface subsystem 203, a processing circuitry 209, a media queue memory 211, an audio/video digital-to-analog conversion (DAC) and RF modulation subsystem 213, an audio/video decoding block 215, a user interface (I/F) management block 217, a delivery error handling block 219, and a queue management block 221.

The media processing system 201 comprises suitable logic, circuitry, and/or code that enable reception of broadcast media and/or retrieval of replacement data. The media processing system 201 comprises, for example, the media communication interface subsystem 203, the processing circuitry 209, the media queue memory 211, the audio/video DACs and RF modulator subsystem 213. The media processing system 201 is integrated into an STB, for example one or more of the set-top box options 115, to enable reception of broadcast media streams, via the media communication interface subsystem 203, from broadcast media head-ends. The media processing system 201 is the operable to enable performing necessary processing of received streams, in the STB, via the processing circuitry 209, to retrieve replacement data, and to generate media streams that are playable via display/playback devices via the audio/video DACs and RF modulation subsystem 213.

The media communication interface subsystem 203 comprises suitable logic, circuitry, and/or code that enable reception of media data from one or more sources. The media communication interface subsystem 203 comprises, for example, the broadcast media communication interface 205, which is operable to enable reception of broadcast media data from one or more broadcast head-ends, and the replacement media communication interface 207, which is operable to enable reception of replacement data from one or more instances of the replacement data server 151.

The processing circuitry 209 comprises suitable logic, circuitry, and/or code that enable performing processing operations to facilitate reception of broadcast media and/or retrieval of replacement data. The processing circuitry 209 comprises, for example, the audio/video decoding block 215, the user I/F management 217, the delivery error handling block 219, and the queue management block 221. The audio/video decoding block 215 comprises functionality that enables performing processing received broadcast media data and/or replacement data operation to extract audio/video information contained therein. The audio/video decoding block 215 comprises, for example, suitable logic, circuitry, and/or code that enable performing of audio and/or video processing operations, including, for example, necessary decompression and/or decoding operations, pertaining to one or more audio/video encoding schemes, which may comprise, for example, MPEG-2, MPEG-4 AVC, MP3, AC-3, AAC, and/or HE-AAC.

The user I/F management block 217 comprises functionality that enables interactions with the replacement media server 151 via the media processing system 201, based on, for example, commonly utilized interfaces and/or an application programming interfaces (API). The user I/F management block 217 is operable, for example, to enable running a HTTP based client functionality that enables establishing peer-to-peer connection with HTTP based server functionlity running on the replacement media server 151, wherein the user input/output is available, for example, via the playback device 111. Alternatively, the user I/F management block 217 is operable to enable running a client functionality that is specific to an API based server functionality running in the replacement media server 151 to enable device-to-device, API/IF based, connectivity. Operations of the user I/F entity 235 enable, for example, prompting for and/or receiving various information from the user, including, for example, access information, product information, and/or data replacement request parameters.

The delivery error handling block 219 comprises suitable logic, circuitry, and/or code that enable detection of delivery errors during reception of broadcast media streams via the media processing system 201. The delivery error handling block 219 tracks, for example, frame and/or transport related information in received TV broadcast to determine if there are missing frames and/or packets that prevents seemingly error-free playback of the received media streams. The delivery error handling block 219 is also operable, for example, to enable detecting out-of-sequence delivery errors based on tracking of frames sequence numbering information for example. Out-of-sequence delivery is relevant, for example, with dependent frames whose processing requires audio/video information carried in reference frames that must be received prior to reception of the reference frames. In an exemplary embodiment of the invention, the delivery error handling block 219 is utilized to generate parameters and/or information that enable identification of corresponding replacement data via the replacement media server 151.

The queue management block 221 comprises suitable logic, circuitry, and/or code that enable managing data queuing to enable and/or to improve playback operations. The queue management block 221 enables managing, for example, buffering of data used during playback operations, wherein such data buffering enable performing retrieval of replacement data and/or combining replacement data onto received media streams. The queued data is buffered, for example, in the media queue memory 211. The media queue memory 211 comprises suitable logic, circuitry, and/or code that enable storage of data, code, and/or other information. The media queue memory 211, for example, is utilized to enable temporary storage and/or buffering during operations by other subsystems and/or entities in the media processing system 201. Consequently, the queue management block 221 and/or the media queue memory 211 enable buffering of received broadcast media streams, for example, to enable performing necessary replacement data retrieval operations.

The audio/video DAC and RF modulation subsystem 213 comprises suitable logic, circuitry, and/or code that enable generation of output audio and/or video streams. The audio/video decoding block 215 is operable, for example, to generate audio and/or video streams from the received broadcast and/or the replacement media data. The resulting audio/video information is playable and/or displayable via suitable audio-visual devices, for example the playback device 111. The audio/video DACs and RF modulation subsystem 213 are operable, for example, to enable performing necessary audio/video encoding and/or modulation operations to ensure playback of the received broadcast media streams, via the playback device 111 for example.

In operation, the media processing system 201 is integrated into an STB to enable reception and playback of media streams from one or more broadcast head-ends. For example, the broadcast media communication 205, the processing circuitry 209, the media queue memory 211, and/or the audio/video DAC and RF modulation subsystem 213 are operable to enable receiving and processing of media streams carried, for example, via RF signaling and/or Internet-based packets.

In an exemplary embodiment of the invention, where delivery errors are encountered during broadcast media reception, the delivery error handling block 219 is utilized to enable error detection, and/or to facilitate retrieval of replacement data. The delivery error handling block 219 is utilized, for example, to detect errors that are caused by interference and/or corruption of frames and/or packets utilized, via broadcast head-ends, to communicate the media streams. The delivery error handling block 219 is utilized to determine whether replacement data is available. For example, in instances where the received media stream comprises a sequence of frames, the delivery error handling block 219 is operable to determine whether there are lost frames. The delivery error handling block 219 then attempts to communicate with the replacement media server 151 to request replacement data. The user I/F management block 217 is utilized to initiate and manage the connection with the replacement media server 151, wherein the replacement media communication interface 207 is utilized to perform the transmission and/or reception of messages to and/or from the replacement media server 151, via the Internet 143 for example. The user I/F management block 217 is also utilized, for example, to enable performing of access security operations where the replacement media server 151 performs authentication and/or verification operations, providing, for example, user and/or product related verification information. The replacement media server 151 communicates the replacement data, if available, to the replacement media communication interface 207, via the Internet 143 for example.

The queue management block 221 is operable, for example, to manage the received replacement data, wherein the replacement data is buffered via the media queue memory 211 to enable combining the replacement data into the error-free portions of the received media streams. The combined data is then processed via the audio/video DAC and RF modulation subsystem 213 to enable error-free playback of the media streams, via the playback device 111 for example.

Figure 2B:
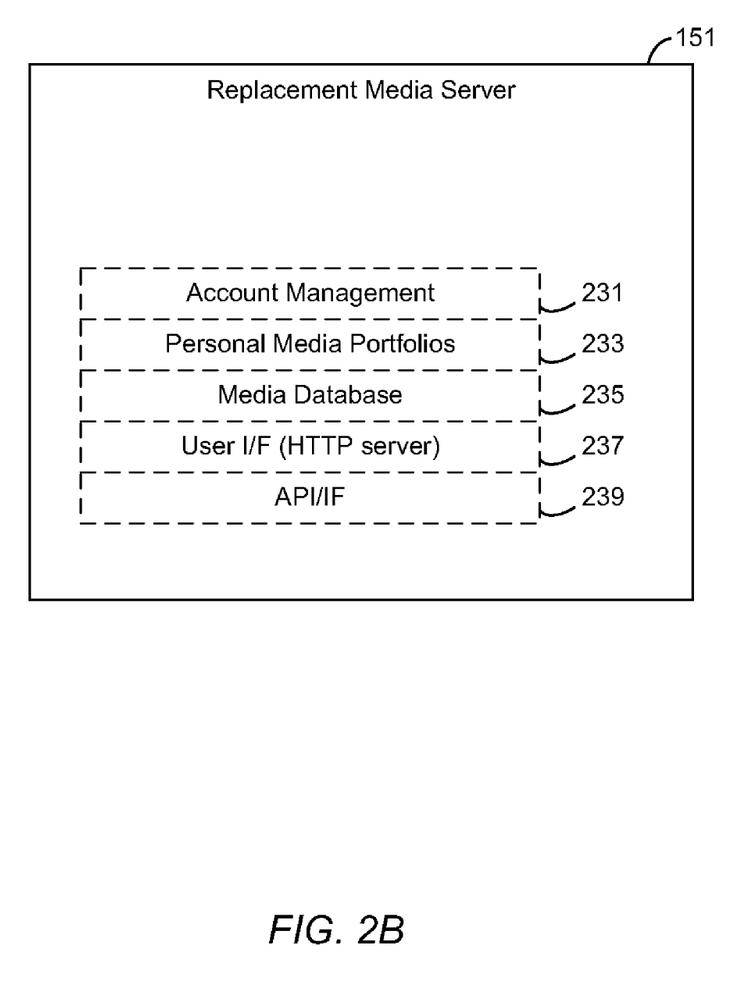
FIG. 2B is a block diagram that illustrates an exemplary media replacement server that provides replacement media data retrievable by set-top box systems during media broadcast, in accordance with an embodiment of the invention.

FIG. 2B is a block diagram that illustrates an exemplary media replacement server that provides replacement media data retrievable by set-top box systems during media broadcast, in accordance with an embodiment of the invention. Referring to FIG. 2B, there is shown the replacement media server 151, account management entity 231, personal media portfolios entity 233, media database entity 235, user interface (I/F) entity 237, and application programming interface (API/IF) entity 239.

The media management server 151 is substantially as described with respect to FIG. 1. In an exemplary embodiment of the invention, the replacement media server 151 comprises a plurality of constituent functional blocks to enable supporting replacement data retrieval during broadcast media reception operations. The replacement media server 151 comprises, for example, the account management entity 231, the personal media portfolios entity 233, the media database entity 235, the user I/F entity 237, and the API/IF entity 239.

The account management entity 231 comprises functionality that enables verification of users' access information. The account management entity 231 enables generating, storing, and/or activating user access information, and that access information is utilized thereafter in subsequent access requests to perform the necessary access verification. The account management entity 231 also enables, for example, comparing provided access information with previously provided and/or stored information during replacement data requests processing in the replacement media server 151. The account management entity 231 is also utilized to perform initial registration when a user attempts to access the replacement media server 151 for the first time. The access information comprises various types of information, including, for example, user identifiers, user passwords, and/or addressing information for devices used by users to enable reception of broadcast media data. At least some of access information is provided by manufacturers of STB devices and/or providers of media broadcasts, or it is generated by users of the broadcast media STBs. The personal media portfolios entity 233 comprises, in one embodiment of the invention, functionality that enables creating, updating, and/or modifying user's broadcast media related information.

The broadcast media related information comprises, for example, information regarding the broadcast media player devices that particular users have acquired and/or used, and/or information pertaining to the various broadcast media providers to which the user has subscribed. This information is then used, for example, to facilitate product and/or service verifications, and/or to enable communicating with the users where such communication is deemed necessary. The broadcast media related information is generated in the personal media portfolios entity 233, in suitable instances of the replacement media server 151, by broadcast media providers based on transactions with users of their products and/or services. The broadcast media related information is also generated and/or modified whenever a user requests replacement data for a media storage element for the first time.

The media database entity 235 comprises comprise suitable logic, circuitry and/or code that manages stored data that is accessed in the replacement data server 151 to facilitate retrieval of replacement data. The media database entity 235 comprises, for example, copies of the broadcast multimedia data streams that are communicated by broadcast media providers. During replacement data retrieval requests, the media database entity 235 verifies data that needs to be retrieved, whether the data is present within replacement data server 151, and if data is present, the media database entity 235 facilitates communication of the replacement data to the entity requesting the replacement data, via the user I/F entity 235 and/or the API/IF entity 237. In an exemplary embodiment of the invention, the replacement media server 151 is operable, via the media database entity 235 for example, to accept or deny replacement data requests based on plurality of service criteria. The service criteria comprise, for example, allowable bandwidth and/or maximum allowable error rates. The service criteria is applicable with regard to each particular user and/or based on the aggregate requested service required via the replacement media server 151 at any given point.

The user I/F entity 235 comprises functionality that enables interactions between users and the replacement media server 151, based on commonly utilized interface for example. The user I/F entity 235 enables, for example, remote access and/or control for replacement data retrieval based on an HTTP-based browsing interactions, available via the media processing system 201 for example. Consequently, the user I/F entity 235 will enable running a HTTP based server functionality via the replacement media server 151 that enable establishing peer-to-peer connection with HTTP based client functionlity running at the user end. The user I/F entity 235 enables, for example, prompting for and/or receiving various information from users, including, for example, access information, product information, and/or data replacement request parameters.

The API/IF entity 237 comprises functionality that enables direct interactions between devices requesting replacement data and the replacement media server 151, based on application programming interface (API) that is specific to a server functionality running in the replacement media server 151. For example, once a determination is made, via the media processing system 201 for example, that replacement data is needed, the API/IF entity 237 enables direct, device-to-device interactions to facilitate the replacement data retrieval independent of user interactions. The API/IF entity 237 is utilized to retrieve replacement data, for example, where there is minimal interactions needed because access information and/or verification information, for example, were previously provided and/or were predefined directly into the replacement media server 151 by third parties. Consequently, the API/IF entity 237 is utilized to enable communication of the replacement data.

Figure 3A:
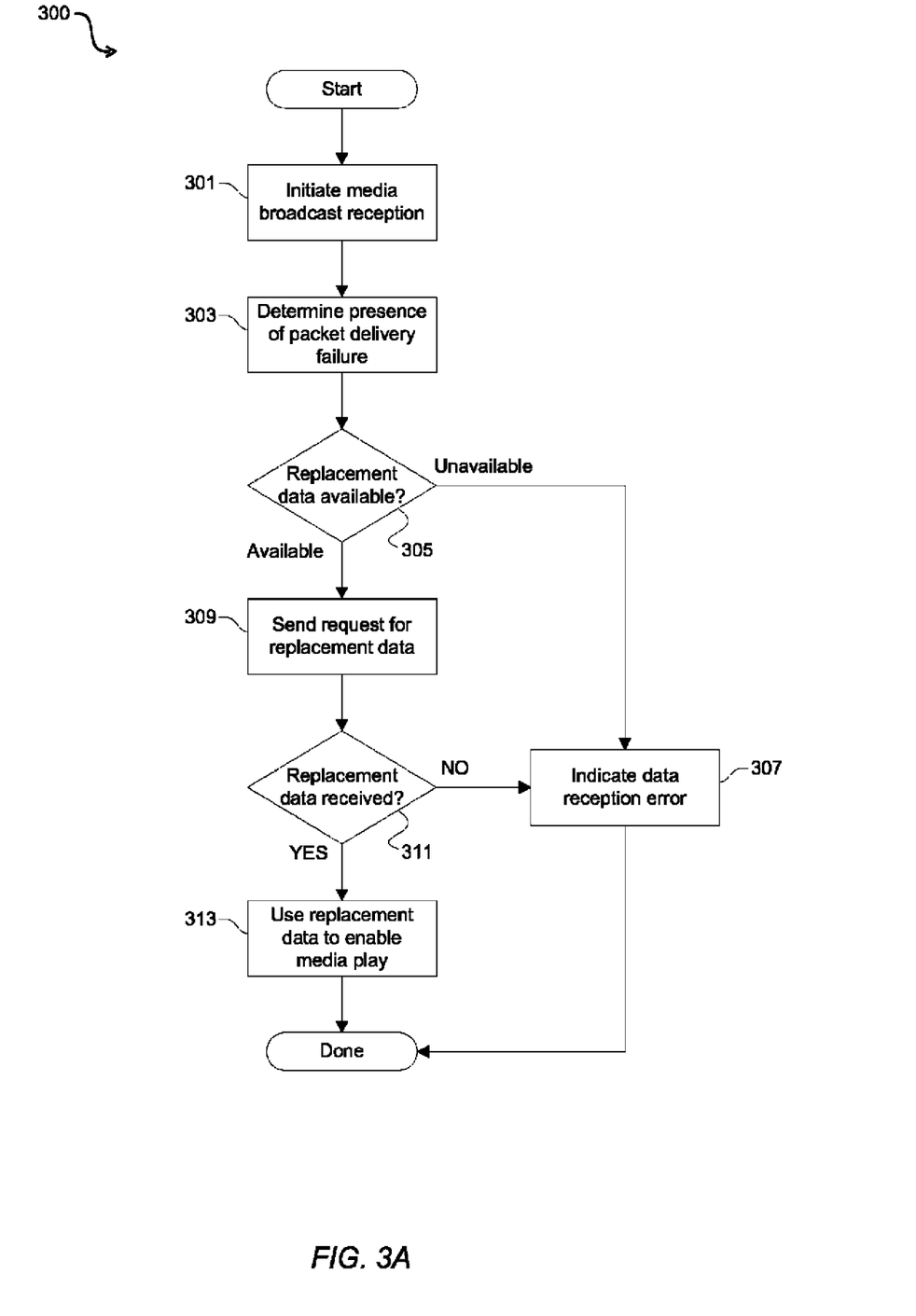
FIG. 3A is a flow chart that illustrates exemplary retrieval of replacement data in replacement media server to enable lost packet delivery during broadcast media reception in set-top boxes, in accordance with an embodiment of the invention.

FIG. 3A is a flow chart that illustrates exemplary retrieval of replacement data in replacement media server to enable lost packet delivery during broadcast media reception in set-top boxes, in accordance with an embodiment of the invention. Referring to FIG. 3A, there is shown a flow chart 300 comprising a plurality of exemplary steps, which may enable retrieving data replacement, from a replacement media server, via an STB during media broadcast reception.

In step 301, broadcast data reception is initiated. For example, the media processing system 201 initiates reception of media broadcast via the broadcast media communication interface 205. In step 303, delivery error detection is performed during media broadcast reception. For example, during media broadcast reception via the media processing system 201, the failed packet handling block 209 in the processing circuitry 209 is utilized to detect packet delivery errors or failures in received broadcast media streams. In step 305, it is determined whether replacement content is available via, for example, a replacement media server. For example, the replacement media communication interface 207, in the media processing system 201, is utilized to determine whether replacement media server 151 is accessible, via the internet 143 for example. In instances where it is determined that the replacement media server 151 is inaccessible, the exemplary steps proceed to step 307. In step 307, an error indication is generated. The error indication may comprise information detailing the cause of failure. The exemplary steps then terminate.

Returning to step 305, in instances where it is determined that the replacement media server 151 is accessible, the exemplary steps proceed to step 309. In step 309, a request for replacement data is communicated to the replacement media server 151. In step 311, it is determined whether replacement data is received from the replacement media server 151. For example, the replacement data may not be received because the replacement data request may fail due to failures encountered while performing one or more of the verifications in the replacement media server 151, because necessary data is not available in the media database 236 in the replacement media server 151. The reception of replacement data may also be due to data loss in the communication between the replacement media server 151 and the media processing system 201. In an exemplary aspect of the invention, the replacement data request is repeated for a predetermined number of retries and/or until it is determined that the failure is final. In instances where it is determined that the replacement data is not available, the exemplary steps proceed to step 307.

Returning to step 311, in instances where the replacement data is received, the exemplary steps proceed to step 313. In step 313, the replacement data is utilized to facilitate successful play of broadcast media. The replacement data is processed via the processing circuitry 209, and the missing packets are inserted, via the media queue 211 for example, to enable continuous and uninterrupted audio/video processing of the media stream via the audio/video DAC & RF modulation subsystem 213.

Figure 3B:
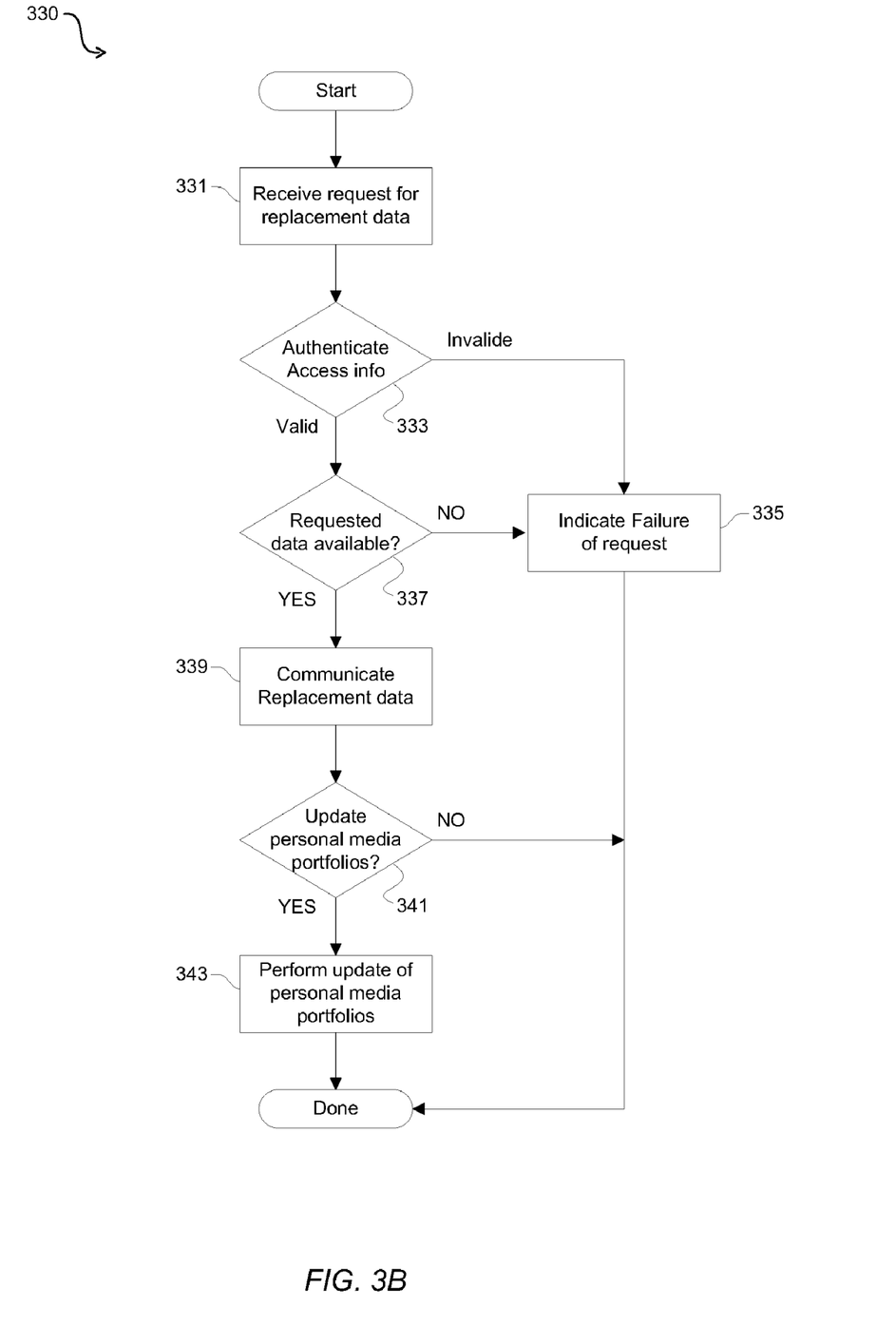
FIG. 3B is a flow chart that illustrates exemplary retrieval of replacement data via a set-top box to enable lost packet delivery during broadcast media reception, in accordance with an embodiment of the invention.

FIG. 3B is a flow chart that illustrates exemplary retrieval of replacement data via a set-top box to enable lost packet delivery during broadcast media reception, in accordance with an embodiment of the invention. Referring to FIG. 3B, there is shown a flow chart 330 comprising a plurality of exemplary steps, which may enable performing data replacement in a replacement media server during media broadcast reception via an STB.

In step 331, a request for replacement data is received in a replacement media server 151. For example, the replacement media server 151 is operable to receive, via the user interface 237 and/or the API/IF 239, a request for replacement data from the media processing system 201. In step 333, access information authentication is performed. For example, the account management entity 231 is utilized to perform necessary access authentication operations in the replacement media server 151. In instances where access authentication fails, the exemplary steps proceed to step 335. In step 335, a request failure indication is generated and communicated back to the requesting entity. The exemplary steps then terminate.

Returning to step 333, in instances where access authentication succeeds, the exemplary steps proceed to step 337. In step 337, it is determined whether the requested replacement data is available. For example, the replacement media server 151 determines, once the access information is verified, whether the requested replacement data is available via the media database 235 for example. In instances where the requested replacement data is unavailable, the exemplary steps proceed to step 335.

Returning to step 337, in instances where the requested replacement data is available, the exemplary steps proceed to step 339. In step 339, the replacement data is communicated to the requesting entity. For example, once the replacement data is found, the replacement media server 151 communicates the data to the media processing system 201. In step 341, it is determined whether to update user personal media portfolios. For example, after communicating replacement data, the replacement media server 151 determines, whether the received request indicates a need to create and/or modify the requesting user's profile, via the personal media portfolios 233. In instances where no personal media portfolios updates are necessary, the exemplary steps terminate. Returning to step 341, in instances where personal media portfolios updates are required, the exemplary steps proceed to step 343. In step 343, the personal media portfolios 233 is updated.

Various embodiments of the invention may comprise a method and system for utilizing a replacement pathway for lost packet delivery during media reception in a set-top box (STB). The media processing system 201 is utilized to determine, via the delivery error handling block 219, delivery errors during reception of broadcast media streams via one or more the set-top box options 115. The media processing system 201 is then utilized to retrieve replacement data from the replacement media server 151. The broadcast media streams are received from the broadcast media server 141 via the Internet 143, from the satellite infrastructure 131 via the satellite dish 133, and/or from the cable-fiber infrastructure 135. The retrieval of the replacement data is performed during playback of receive media streams via the media processing system 201. Communication of the broadcast media streams comprises the introduction of delays to accommodate for the retrieval of replacement data. Received broadcast media streams are buffered in the media processing system 201, via the queue management block 221 and/or the media queue memory 211, to enable retrieval of replacement data to enable seamless playback of received media streams.

During replacement data retrieval operations, the replacement media server 151 performs access authentication operations, via the account management entity 231. The replacement media server 151 is operable to enable creation and/or modification of user related portfolios via the personal media portfolios 233, to facilitate future product verifications and/or user communication. The replacement media server 151 enables interactions by remote users, to request replacement data, wherein the user interactions are based on various markup language interfaces supported via the user interface 237 and/or based on dedicated APIs supported via the API interface 239. The replacement media server 151 may deny replacement data requests based on plurality of service denial criteria, which may comprise allowable bandwidth and/or maximum allowable error rates. Exemplary markup language may comprise HTML and XML, and any variants thereof.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for utilizing a replacement pathway for lost packet delivery during media reception in a set-top box (STB).

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for data processing, the method comprising:
   when receiving a broadcast media stream from one or more broadcast head-ends, determining if there is loss of data in said received broadcast media stream;
   communicating access information to a remote replacement server, wherein said communicated access information causes user authentication and/or device authentication in said remote replacement server;
   retrieving replacement data from a local storage device and/or from said remote replacement server if it is determined that loss of data has occurred, based on said authentication by said remote replacement server to allow said retrieval of said replacement data; and
   seamlessly presenting said received broadcast media stream utilizing at least said retrieved replacement data.

2. The method according to claim 1, wherein said one or more broadcast head-ends comprise satellite head-ends, cable head-ends, and/or broadcast media head-ends.

3. The method according to claim 1, wherein said broadcast media stream comprises delay to accommodate for said determination of said loss of data and/or said retrieval of replacement data.

4. The method according to claim 1, comprising buffering said received broadcast media stream to enable performing determination of loss of data and/or said retrieval of replacement data.

5. The method according to claim 1, wherein said remote replacement server creates and/or updates personal user portfolios based on said user authentication.

6. The method according to claim 1, wherein said remote replacement server blocks said retrieval of replacement media based on service denial criteria.

7. The method according to claim 6, wherein said service denial criteria is based on a maximum allowable error rate and/or bandwidth availability.

8. The method according to claim 1, comprising accessing said remote replacement server based on addressing and/or authentication information received from said one or more broadcast head-ends.

9. The method according to claim 8, comprising accessing said remote replacement server based on one or more of user input, user profile information, and/or access device identity.

10. A system for video processing, the system comprising:
    one or more circuits that is operable to, when receiving a broadcast media stream from one or more broadcast head-ends, determine if there is loss of data in said received broadcast media stream;
    said one or more circuits are operable to communicate access information to a remote replacement server, wherein said communicated access information causes user authentication and/or device authentication in said remote replacement server;
    said one or more circuits is operable to retrieve replacement data from a local storage device and/or from said remote replacement server if it is determined that loss of data has occurred, based on said authentication by said remote replacement server to allow said retrieval of said replacement data; and
    said one or more circuits is operable to seamlessly present said broadcast media stream utilizing at least said retrieved replacement data.

11. The method according to claim 10, wherein said one or more broadcast head-ends comprise satellite head-ends, cable head-ends, and/or broadcast media head-ends.

12. The system according to claim 10, wherein said broadcast media stream comprises delay to accommodate for said determination of said loss of data and/or said retrieval of replacement data.

13. The system according to claim 10, wherein said one or more circuits is operable to buffer said received broadcast media stream to enable performing determination of loss of data and/or said retrieval of replacement data.

14. The system according to claim 10, wherein said remote replacement server creates and/or updates personal user portfolios based on said user authentication.

15. The system according to claim 10, wherein said remote replacement server blocks said retrieval of replacement media based on service denial criteria.

16. The system according to claim 15, wherein said service denial criteria is based on a maximum allowable error rate and/or bandwidth availability.

17. The system according to claim 10, wherein said one or more circuits is operable to access said remote replacement server based on addressing and/or authentication information received from said one or more broadcast head-ends.

18. The system according to claim 17, wherein said one or more circuits is operable to access said remote replacement server based on one or more of user input, user profile information, and/or access device identity.

19. A method for data processing, the method comprising:
when receiving a broadcast media stream from one or more broadcast head-ends, determining if there is loss of data in said received broadcast media stream;
retrieving replacement data, wherein said replacement data is retrieved from a local storage device and/or from a remote replacement server if it is determined that loss of data has occurred;
seamlessly presenting said received broadcast media stream utilizing at least said retrieved replacement data; and
accessing said remote replacement server based on addressing and/or authentication information received from said one or more broadcast head-ends.

20. The method according to claim 19, wherein said one or more broadcast head-ends comprise satellite head-ends, cable head-ends, and/or broadcast media head-ends.

21. The method according to claim 19, wherein said broadcast media stream comprises delay to accommodate for said determination of said loss of data and/or said retrieval of replacement data.

22. The method according to claim 19, comprising buffering said received broadcast media stream to enable performing determination of loss of data and/or retrieval of replacement data.

23. The method according to claim 19, wherein said remote replacement server creates and/or updates personal user portfolios based on user authentication performed to allow said retrieval of said replacement data.

24. The method according to claim 19, wherein said remote replacement server blocks said retrieval of replacement media based on service denial criteria.

25. The method according to claim 24, wherein said service denial criteria is based on a maximum allowable error rate and/or bandwidth availability.

26. The method according to claim 19, comprising accessing said remote replacement server based on one or more of user input, user profile information, and/or access device identity.

27. A system for video processing, the system comprising:
one or more circuits that is operable to, when receiving a broadcast media stream from one or more broadcast head-ends, determine if there is loss of data in said received broadcast media stream;
said one or more circuits is operable to retrieve replacement data, wherein said replacement data is retrieved from a local storage device and/or from a remote replacement server if it is determined that loss of data has occurred;
said one or more circuits is operable to seamlessly present said broadcast media stream utilizing at least said retrieved replacement data; and
said one or more circuits is operable to access said remote replacement server based on addressing and/or authentication information received from said one or more broadcast head-ends.

28. The method according to claim 27, wherein said one or more broadcast head-ends comprise satellite head-ends, cable head-ends, and/or broadcast media head-ends.

29. The system according to claim 27, wherein said broadcast media stream comprises delay to accommodate for said determination of said loss of data and/or said retrieval of replacement data.

30. The system according to claim 27, wherein said one or more circuits is operable to buffer said received broadcast media stream to enable performing determination of loss of data and/or said retrieval of replacement data.

31. The system according to claim 27, wherein said remote replacement server creates and/or updates personal user portfolios based on user authentication performed to allow said retrieval of said replacement data.

32. The system according to claim 27, wherein said remote replacement server blocks said retrieval of replacement media based on service denial criteria.

33. The system according to claim 32, wherein said service denial criteria is based on a maximum allowable error rate and/or bandwidth availability.

34. The system according to claim 27, wherein said one or more circuits is operable to access said remote replacement server based on one or more of user input, user profile information, and/or access device identity.

* * * * *